United States Patent [19]

Tadokoro et al.

[11] 3,940,680
[45] Feb. 24, 1976

[54] A.C. - D.C. POWER CONVERTER FOR D.C. LOAD

[75] Inventors: Tomio Tadokoro; Toshikatsu Kouno; Akio Sasaki, all of Katsuta, Japan

[73] Assignee: Hitachi, Ltd., Japan

[22] Filed: Dec. 24, 1974

[21] Appl. No.: 536,249

[30] Foreign Application Priority Data
Dec. 27, 1973 Japan............................ 48-144529
Jan. 14, 1974 Japan................................ 49-6593

[52] U.S. Cl...... 321/27 R; 104/148 R; 104/148 LM; 191/5; 318/138; 318/441; 318/506; 321/45 C
[51] Int. Cl.²......................................... H02M 7/00
[58] Field of Search.......................... 321/8, 43–47, 321/27 R; 104/148 R, 148 LM; 191/3–5; 307/43, 45, 56, 73, 82, 252 L, 252 M, 252 P, 252 Q; 318/124, 138, 248, 441, 505, 506, 507

[56] References Cited
UNITED STATES PATENTS

| | | | |
|---|---|---|---|
| 2,873,383 | 2/1959 | Dennis............................ | 318/124 X |
| 3,262,037 | 7/1966 | McCabe et al. ................ | 318/441 X |
| 3,321,685 | 5/1967 | Johannes ........................ | 318/507 X |
| 3,434,034 | 3/1969 | Garber et al..................... | 321/47 X |
| 3,577,929 | 5/1971 | Onoda et al. ................. | 104/148 LM |
| 3,659,119 | 4/1972 | Kasama et al. .................. | 321/43 X |
| 3,739,186 | 6/1973 | Gokey et al........................ | 321/8 R |
| 3,761,793 | 9/1973 | Naito ............................ | 318/506 X |
| 3,781,645 | 12/1973 | Grom et al........................ | 321/45 C |
| 3,794,893 | 2/1974 | Arpino.............................. | 321/8 R |

*Primary Examiner*—William M. Shoop
*Attorney, Agent, or Firm*—Craig & Antonelli

[57] ABSTRACT

A power converter which can operate with both a D.C. power source and an A.C. power source for supplying electric power to a D.C. load such as a D.C. motor. The power converter comprises thyristors, a diode, a reactor and a capacitor. A plurality of series circuits each including two series-connected thyristors are connected in parallel to provide A.C. terminals at the series connection points of the thyristors and to provide D.C. terminals at the parallel connection points of the series circuits. The diode is interposed between the parallel-connected series circuits of the thyristors, and the reactor and the capacitor are connected in series to form a series circuit which is connected in parallel with the series circuits of the thyristors. The power converter is connected at the D.C. terminals between the power source and the load to function as a chopper when the power source supplies D.C. power to the load. On the other hand, when the power source supplies A.C. power to the load, the power converter is connected at the A.C. terminals to the power source and at the D.C. terminals to the load to function as a converter or inverter. The desired function of the power converter is obtained by controlling the gate signal applied to the gate of each of the thyristors.

6 Claims, 14 Drawing Figures

FIG. 10

| OPERATION<br>CONTACTOR | DC POWER RUNNING | DC REGENERATIVE BRAKING | AC POWER RUNNING | AC REGENERATIVE BRAKING |
|---|---|---|---|---|
| ABB | ○ | ○ | ○ | ○ |
| CSA |  |  | ○ | ○ |
| CSD | ○ | ○ |  |  |
| HB | ○ | ○ |  |  |
| LB | ○ | ○ | ○ | ○ |
| K₁ | ○ | ○ | ○ |  |
| K₂ | ○ | ○ | ○ | ○ |
| K₃ | ○ |  |  |  |
| K₄ |  |  |  | ○ |
| K₅ |  |  |  | ○ |
| K₆ |  | ○ | ○ | ○ |
| VR₁ | CHOPPER | CHOPPER | CONVERTER | INVERTER |
| VR₂ | CHOPPER | CHOPPER | CONVERTER | CONVERTER |

3,940,680

A.C. - D.C. POWER CONVERTER FOR D.C. LOAD

BACKGROUND OF THE INVENTION

This invention relates to a power converter comprising controlled rectifiers for supplying electric power to a D.C. load such as a D.C. motor, and more particularly to a universal power converter which can operate with both a D.C. power source and an A.C. power source.

Prior art power converters used in conjunction with a power source for supplying electric power to a D.C. load such as a D.C. motor are classified into two types depending on whether the power source is a D.C. power supply or an A.C. power supply. That is, a power converter unit such as a chopper is employed for the desired D.C. - D.C. conversion when the power source is a D.C. power supply, and a power converter unit of the kind comprising a bridge connection of controlled rectifiers is employed for the desired A.C. - D.C. conversion when the power source is an A.C. power supply.

Thus, it has been common practice to design and construct power converters for exclusive use with either a D.C. power source or an A.C. power source, and it has been necessary to prepare a power converter consisting of a D.C. - D.C. power converter unit and an A.C. - D.C. power converter unit and to selectively place such converter units in operation in an A.C. - D.C. dual-service electric car which is adapted to run in both a D.C. powered section and an A.C. powered section of an electrified railway system. Therefore, the prior art power converter has been defective in that not only the overall size and weight thereof are considerably large but also the manufacturing cost thereof is considerably high.

Recently, an A.C. - D.C. dual-service electric car is strongly demanded which can singly run in both an A.C. powered section and a D.C. powered section of an electrified railway system under both a power running condition and a regenerative braking condition.

SUMMARY OF THE INVENTION

It is a primary object of the present invention to provide a power converter which is operable with both a D.C. power source and an A.C. power source and which is smaller in size, lighter in weight and less expensive than prior art ones.

Another object of the present invention is to apply such power converter to an electric car so that the electric car can run in both a D.C. powered section and an A.C. powered section of an electrified railway system under both a power running condition and a regenerative braking condition.

In accordance with the present invention, there is provided a power converter for regulating electric power supplied from a power source to a D.C. load, comprising a group of controlled rectifiers arranged to constitute a plurality of series circuits each including at least two said controlled rectifiers, said series circuits of said controlled rectifiers being connected in parallel to provide A.C. terminals at the series connection points of said controlled rectifiers and to provide D.C. terminals at the parallel connection points of said series circuits, a rectifier interposed between said parallel-connected series circuits of said controlled rectifiers, and a series circuit of a reactor and a capacitor connected in parallel with said series circuits of said controlled rectifiers.

In accordance with the present invention, there is further provided a power converter of the above character, wherein gate control means is provided and comprises means for simultaneously controlling the gates of said controlled rectifiers in said series circuits when said power source is a D.C. power supply, and means for alternately controlling the gates of said controlled rectifiers in said series circuits when said power source is an A.C. power supply.

Other objects, features and advantages of the present invention will become apparent from the following detailed description of preferred embodiments thereof taken in conjunction with the accompanying drawings.

BRIEF DESCRIPTION OF THE DRAWINGS

FIG. 10 shows the on-off states of various contactors in the power converter shown in FIG. 6.

DESCRIPTION OF THE PREFERRED EMBODIMENTS

Prior art power converters will be described with reference to FIGS. 1 and 2 before describing the present invention in detail.

Figure 1:
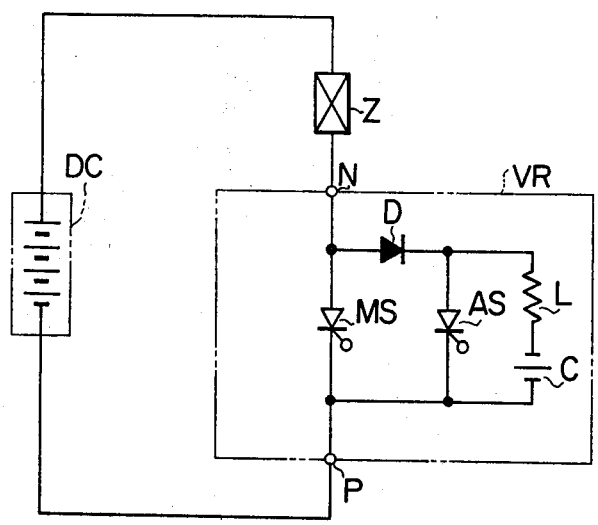
FIG. 1 is a circuit diagram showing one form of prior art power converters used in conjunction with a D.C. power source.

FIG. 1 shows one form of prior art power converters used in conjunction with a D.C. power source. Referring to FIG. 1, electric power supplied from a D.C. power source DC to a load Z is regulated by a power converter VR. This power converter VR carries out the desired D.C. - D.C. conversion of D.C. power supplied from the D.C. power source DC and a chopper is commonly known as this type of power converter. It will be seen from FIG. 1 that this chopper type power converter VR is a so-called D.C. switch including a main thyristor MS, an auxiliary thyristor AS, a commutating reactor L, a commutating capacitor C and a commutating diode D. The main thyristor MS is first turned on to allow flow of main current from the D.C. power source DC to the load Z, and the auxiliary thyristor AS is then turned on to cause electrical oscillation of the commutating reactor L and commutating capacitor C thereby turning off the main thyristor MS so as to control the conduction period of the main current supplied. Thus, the flow of current from the D.C. power source DC to the load Z is suitably permitted and interrupted to control the current supplied to the load Z so that the power supplied from the power source DC to the load Z can be regulated. The power converter VR is connected to the D.C. power source DC and load Z at a pair of positive and negative terminals P and N respectively.

Figure 2:
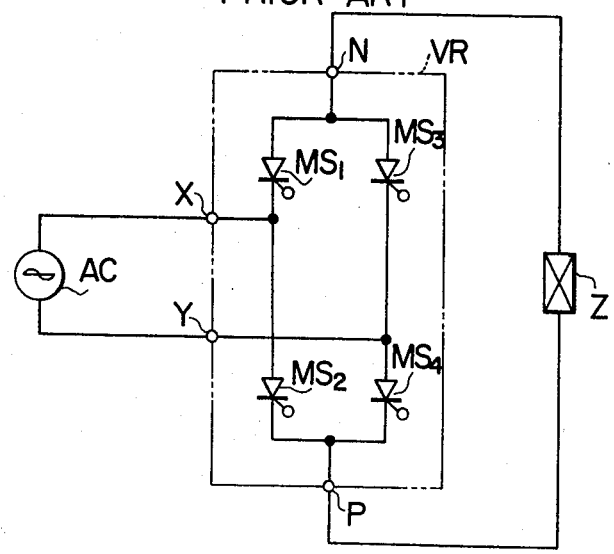
FIG. 2 is a circuit diagram showing one form of prior art power converters used in conjunction with an A.C. power source.

FIG. 2 shows one form of prior art power converters used in conjunction with an A.C. power source. Referring to FIG. 2, electric power supplied from an A.C. power source AC to a load Z is regulated by a power converter VR. This power converter VR carries out the desired A.C. - D.C. conversion of power supplied from the A.C. power source AC and a structure in the form of a bridge connection of thyristors $MS_1$ to $MS_4$ as shown in FIG. 2 is commonly known as this type of power converter. In this power converter VR, the operating phase of the thyristors $MS_1$ to $MS_4$ is controlled to control the current supplied to the load Z so that the power supplied from the power source AC to the load Z can be regulated. The power converter VR is connected to the load Z at a pair of positive and negative terminals P and N and to the A.C. power source AC at a pair of A.C. terminals X and Y.

It will be seen from the above description that prior art power converters have quite limited applications, that is, they are usable for only an A.C. application or a D.C. application. It has therefore been necessary to prepare both a D.C. - D.C. power converter unit and an A.C. - D.C. power converter unit so as to provide a universal power converter which can operate with both a D.C. power source and an A.C. power source.

The present invention provides a universal power converter which possesses singly both the function of a D.C. - D.C. power converter unit and the function of an A.C. - D.C. power converter unit so that it can operate with both a D.C. power source and an A.C. power source.

Figure 3:
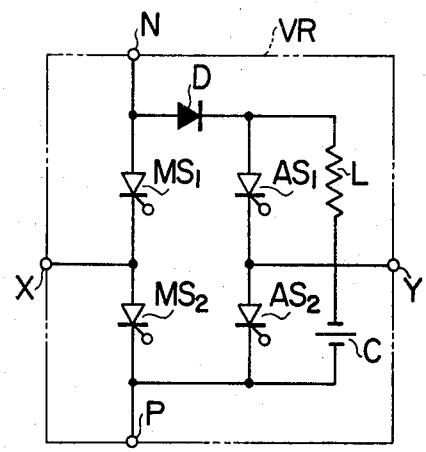
FIG. 3 is a circuit diagram showing an embodiment of the power converter according to the present invention.

FIG. 3 shows an embodiment of the power converter VR according to the present invention. Referring to FIG. 3, the power converter VR comprises a pair of series-connected main thyristors $MS_1$ and $MS_2$ and a pair of series-connected auxiliary thyristors $AS_1$ and $AS_2$. The series connection point of the main thyristors $MS_1$ and $MS_2$ provides an A.C. terminal X, and the series connection point of the auxiliary thyristors $AS_1$ and $AS_2$ provides another A.C. terminal Y. The series circuit of the main thyristor pair is connected in parallel with the series circuit of the auxiliary thyristor pair, and a diode D is connected between these parallel-connected series circuit of the thyristors. The parallel connection points of these two series circuits of the thyristors provide a pair of D.C. terminals, that is, a positive terminal P and a negative terminal N as shown. A series circuit of a commutating reactor L and a commutating capacitor C is connected in parallel with these two series circuits of the thyristors.

When this power converter VR is operated in a D.C. - D.C. power conversion mode, the power converter VR is connected at the D.C. terminals P and N thereof to a D.C. power source DC and a load Z respectively in a manner as shown in FIG. 1, and the A.C. terminals X and Y thereof are open-circuited. The power converter VR in such a state has a circuit structure of a chopper in which the main thyristors $MS_1$, $MS_2$ and the auxiliary thyristors $AS_1$, $AS_2$ are connected in series respectively. Therefore, in the power converter VR acting as the chopper, the main thyristors $MS_1$ and $MS_2$ are simultaneously turned on to permit flow of main current from the D.C. power source DC to the load Z through the negative and positive terminals N and P, and the auxiliary or commutating thyristors $AS_1$ and $AS_2$ and then simultaneously turned on to cause electrical oscillation of the commutating reactor L and commutating capacitor C thereby turning off the main thyristors $MS_1$ and $MS_2$ to interrupt the flow of the main current.

On the other hand, when the power converter VR is operated in an A.C. - D.C. power conversion mode, the power converter VR is connected at the A.C. terminals X and Y thereof to an A.C. power source AC and at the D.C. terminals P and N thereof to a load Z in a manner as shown in FIG. 2. The power converter VR in such a state has a circuit structure of a variable voltage controller in which the four thyristors are connected in the form of a bridge circuit. Therefore, the main current flowing across the negative and positive terminals N and P can be controlled by alternately controlling the phase of the signal applied to the gate of each of the four thyristors $MS_1$, $MS_2$, $AS_1$ and $AS_2$. In this case, the power converter VR can be operated as a converter or an inverter by suitably selecting the manner of application of the signal to the gate of each of the four thyristors. The commutating reactor L and commutating capacitor C serve as a smoothing means in this particular application.

Figure 4:
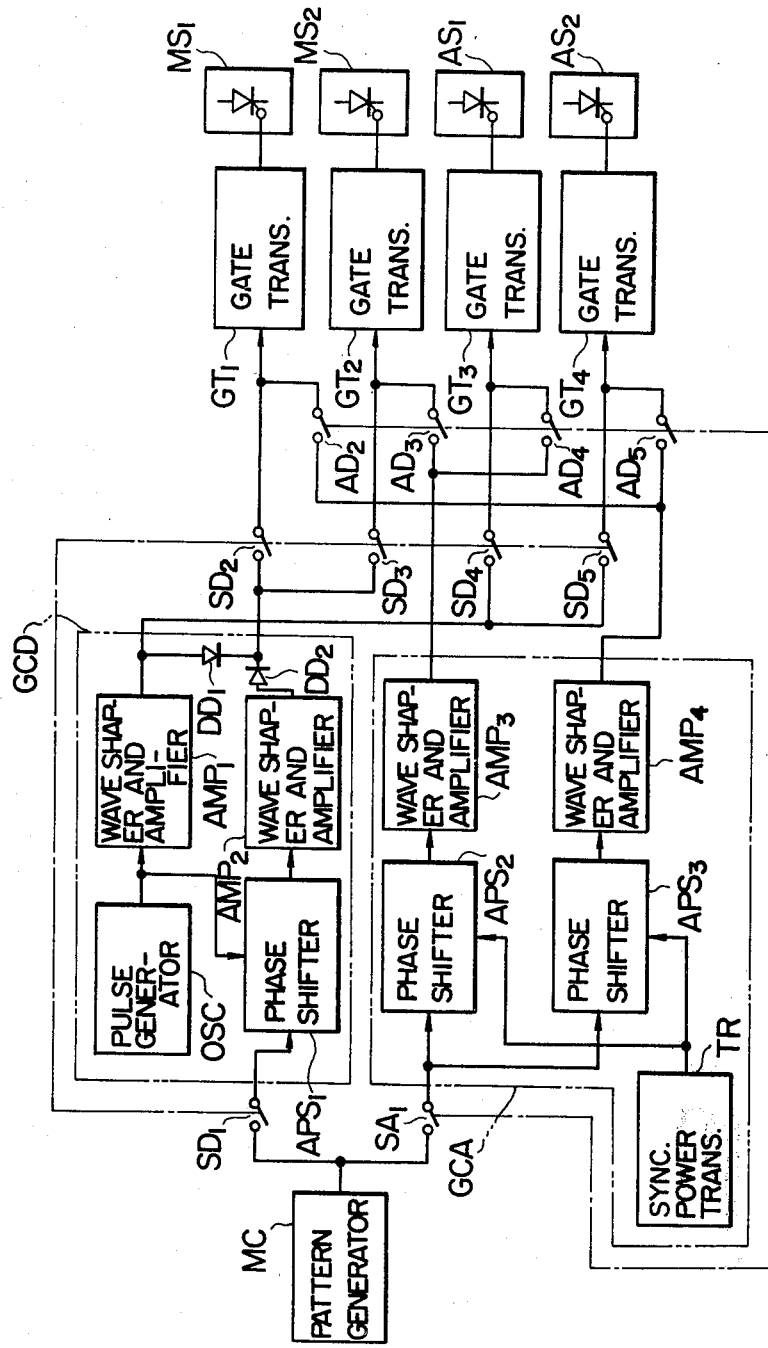
FIG. 4 is a circuit diagram showing one form of gate control means for controlling the thyristors in the power converter shown in FIG. 3.

FIG. 4 shows one form of gate control means preferably employed for the universal power converter according to the present invention.

In the D.C. - D.C. conversion mode, changeover switches $SD_1$ to $SD_5$ for D.C. operation are closed, and the main thyristors $MS_1$, $MS_2$ and auxiliary thyristors $AS_1$, $AS_2$ are controlled by a first gate control unit GCD so that the power converter VR can function as a chopper, A pulse generator OSC in the first gate control unit GCD generates a rectangular pulse signal having a predetermined frequency. This pulse signal is applied to a first wave shaper and amplifier $AMP_1$ to be subjected to wave shaping and amplification. The output of the first wave shaper and amplifier $AMP_1$ is applied to the gate of the auxiliary thyristors $AS_1$ and $AS_2$ simultaneously through the change-over switches $SD_4$ and $SD_5$ and through gate trantransformers $GT_3$ and $GT_4$. This output is also applied to the gate of the main thyristors $MS_1$ and $MS_2$ simultaneously through a first reverse-current blocking diode $DD_1$, change-over switches $SD_2$ and $SD_3$, and gate transformers $GT_1$ and $GT_2$. According to this manner of thyristor control, the main current tending to flow from the negative terminal N to the positive terminal P of the universal power converter VR as a result of turn-on of the main thyristors $MS_1$ and $MS_2$ does not appear in any substantial amount due to the fact that the auxiliary thyristors $AS_1$ and $AS_2$ are also simultaneously turned on to immediately turn off the main thyristors $MS_1$ and $MS_2$. This state is referred to herein that the thyristors have a minimum duty factor. In order to permit flow of the main current flow from the negative terminal N to the positive terminal P of the power converter VR, it is necessary to turn on the main thyristors $MS_1$ and $MS_2$ before the auxiliary thyristors $AS_1$ and $AS_2$ are turned on.

The rectangular pulse signal generated by the pulse generator OSC is also applied to the gate of the main thyristors $MS_1$ and $MS_2$ through a first phase shifter $APS_1$, a second wave shaper and amplifier $AMP_2$, a second reverse-current blocking diode $DD_2$, change-over switches $SD_2$ and $SD_3$, and gate transformers $GT_1$ and $GT_2$. A pattern generator MC is connected to the first phase shifter $APS_1$ via the change-over switch $SD_1$ to apply a control signal to the first phase shifter $APS_1$. When no control signal is applied from the pattern generator MC to the first phase shifter $APS_1$ through the change-over switch $SD_1$, the first phase shifter $APS_1$ does not carry out any phase control, and the outputs appear from the wave shaper and amplifiers $AMP_1$ and $AMP_2$ simultaneously in synchronized relation. However, when the pattern generator MC generates the control signal and the output thereof is gradually increased, the first phase shifter $ASP_1$ operates so that the appearing timing of the pulse output of the second wave shaper and amplifier $AMP_2$ is gradually advanced relative to that of the pulse output of the first wave shaper and amplifier $AMP_1$. Therefore, the main thyristors $MS_1$ and $MS_2$ are turned on before the auxiliary thyristors $AS_1$ and $AS_2$ are turned on, and the main current flows through the main thyristors $MS_1$ and $MS_2$ until the main thyristors $MS_1$ and $MS_2$ are turned off as a result of turn-on of the auxiliary thyristors $AS_1$ and $AS_2$. In this manner, the timing with which the gate signal is applied to the gate of the main thyristors $MS_1$, $MS_2$ and to the gate of the auxiliary thyristors $AS_1$, $AS_2$ is controlled in the D.C. - D.C. conversion mode so as to control the duty factor of the thyristor chopper thereby controlling the conduction period of the main current.

In the A.C. - D.C. conversion mode, the change-over switches $SD_1$ to $SD_5$ for D.C. operation are opened and change-over switches $SA_1$ to $SA_5$ for A.C. operation are closed, and the main thyristors $MS_1$, $MS_2$ and auxiliary thyristors $AS_1$, $AS_2$ are controlled by a second gate control unit GCA so that the power converter VR can operate as a variable voltage controller type converter or inverter in which the thyristors are connected in bridge fashion. A synchronous power transformer TR in the second gate control unit GCA has its primary winding connected to the A.C. terminals X and Y of the universal power converter VR so as to provide an A.C. signal which is synchronous with the A.C. power supplied from the A.C. power source. This synchronous signal is applied to a pair of a second phase shifter $APS_2$ and a third phase shifter $APS_3$ which provide outputs having electrical angles 180° different from each other. In this case, a positive synchronous signal is applied to the second phase shifter $APS_2$. The output of the second phase shifter $APS_2$ is subjected to wave shaping and amplification by a third wave shaper and amplifier $AMP_3$, and the pulse output of this wave shaper and amplifier $AMP_3$ is applied to the gate of the main thyristor $MS_2$ and auxiliary thyristor $AS_1$ simultaneously through the change-over switches $AD_3$ and $AD_4$ and through the gate transformers $GT_2$ and $GT_3$.

The output of the third phase shifter $APS_3$ which differs by 180° in electrical angle from the output of the second phase shifter $APS_2$ is similarly subjected to wave shaping and amplification by a fourth wave shaper and amplifier $AMP_4$, and the output of this wave shaper and amplifier $AMP_4$ is applied to the gate of the main thyristor $MS_1$ and auxiliary thyristor $AS_2$ simultaneously through the change-over switches $AD_2$ and $AD_5$ and through the gate transformers $GT_1$ and $GT_4$. Thus, the electrical angles of the gate signals applied to the thyristors $MS_1$ and $AS_2$ are equal to each other, and the electrical angles of the gate signals applied to the thyristors $MS_2$ and $AS_1$ are also equal to each other, but the electrical angle of the gate signal applied to the thyristor $AS_2$ is different by 180° from that applied to the thyristor $MS_2$.

When the control signal is applied from the pattern generator MC to the second and third phase shifters $APS_2$ and $APS_3$ through the change-over switch $SA_1$, these phase shifters $APS_2$ and $APS_3$ deliver pulse signal outputs which have an electrical angle different from that of the synchronous signal obtained by the transformer TR. The output signals of the second and third phase shifters $APS_2$ and $APS_3$ can be adjusted to be variable within the electrical angle range of 0° to 180° relative to the synchronous signal output of the transformer TR depending on the level of the control signal applied from the pattern generator MC. When this electrical angle is controlled to lie within the range of 0° to 90°, the universal power converter VR operates as a converter, while when the electrical angle is controlled to lie within the range of 90° to 180°, the power converter VR operates as an inverter. More precisely, no output voltage appears from the universal power converter VR when this electrical angle is 90°, and the output voltage increases gradually as the electrical angle is gradually changed from 90° toward 0°, while the negative output voltage increases gradually as the electrical angle is gradually changed from 90° toward 180°. Thus, in the A.C. - D.C. conversion mode, the timing with which the pulse signal is applied to the gate of the main and auxiliary thyristors $MS_2$ and $AS_1$ and to the gate of the main and auxiliary thyristors $MS_1$ and $AS_2$ is suitably adjusted and the operating phase of the variable voltage controller type converter or inverter is controlled for controlling the output voltage. Although the above description has referred to symmetrical control of the thyristors, the phase shifter may be provided for each of the thyristors for asymmetrical control. In such a case, the electrical angles of the gate signals applied to the thyristors $AS_2$ and $MS_2$ are selected to differ by 180° from each other, and the electrical angles of the gate signals applied to the thyristors $MS_1$ and $AS_1$ are also selected to differ by 180° from each other, while the electrical angle of the gate signal applied to the thyristor $MS_2$ is selected so as not to be equal to that for the thyristor $AS_1$.

It will thus be understood that the gate signal applied to the gate of the main thyristors is merely suitably changed over so that the single power converter can operate as a chopper type converter in the D.C. - D.C. conversion mode and as a variable voltage controller type converter or inverter in the A.C. - D.C. conversion mode.

Figure 5:
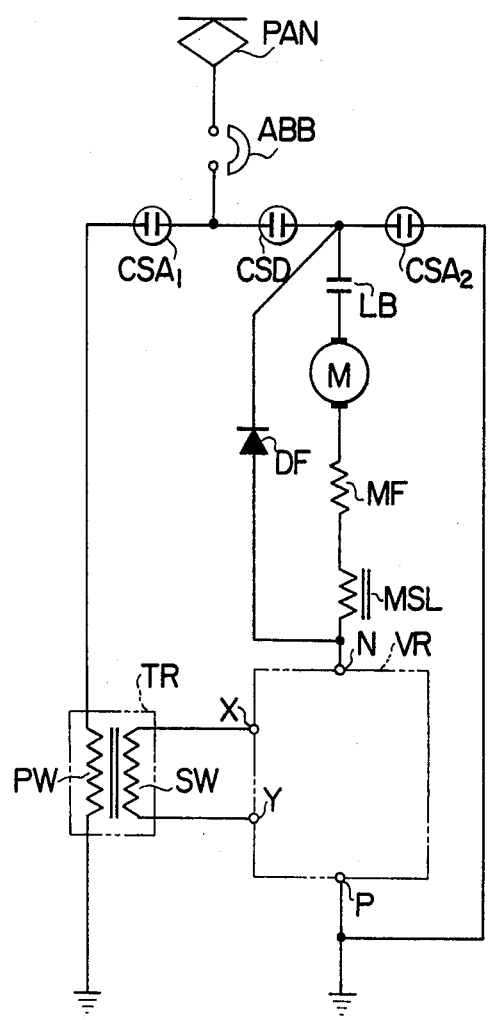
FIG. 5 is a circuit diagram showing an application of the power converter according to the present invention to an A.C. - D.C. dual-service electric car.

FIG. 5 shows an application of the universal power converter according to the present invention to an A.C. - D.C. dual-service electric car which is adapted to run in both an A.C. powered section and a D.C. powered section of an electrified railway system. The main circuit shown in FIG. 5 includes a pantograph PAN, an air-blast circuit breaker ABB, contactors $CSA_1$, $CSA_2$ and CSD of an A.C. - D.C. change-over unit, a line breaker LB, a main motor armature M, a main motor field winding MF, a main smoothing reactor MSL, a free-wheel diode DF, a main transformer TR having a primary winding PW and a secondary winding SW, and a universal power converter VR having a structure as shown in FIG. 3.

In a section of an electrified railway system in which the trolley wire is supplied with a D.C. voltage, the contactors $CSA_1$ and $CSA_2$ of the A.C. - D.C. change-over unit are opened and the contactor CSD of the A.C. - D.C. change-over unit is closed. As a result, contacts arranged for interlocking operation with this contactor CSD are actuated to change over the signal circuits in the first and second gate control units GCD and GCA so that the universal power converter VR can function as a chopper type power converter. Then, when the air-blast circuit breaker ABB and line breaker LB are closed, the main motor in the electric car is energized by the D.C. power supplied from the trolley wire via the circuit which is traced from the trolley wire — pantograph PAN — air-blast circuit breaker ABB — contactor CSD of A.C. - D.C. change-over unit — line breaker LB — main motor armature M — main motor field winding MF — main smoothing reactor MSL — universal power converter VR to ground. The speed control of the electric car is achieved by controlling the duty factor of the universal power converter VR functioning as the chopper thereby regulating the voltage applied to the main motor. The free-wheel diode DF is provided so as to ensure smooth supply of circulating current to the main motor via the circuit which is traced from the main motor armature M — main motor field winding MF — main smoothing reactor MSL — free-wheel diode DF — line breaker LB to the main motor armature M even when the chopper is in the non-conducting state.

On the other hand, in a section of the electrified railway system in which the trolley wire is supplied with an A.C. voltage, the contactor CSD of the A.C. - D.C. change-over unit is opened and the contactors $CSA_1$ and $CSA_2$ are closed. As a result, contacts arranged for interlocking operation with these contactors $CSA_1$ and $CSA_2$ are actuated to change over the signal circuits in the first and second gate control units GCD and GCA so that the universal power converter VR can now function as a variable voltage controller type converter. Then, when the air-blast circuit breaker ABB and line breaker LB are closed, the A.C. power is supplied from the trolley wire to the primary winding PW of the main transformer TR via the circuit which is traced from the trolley wire — pantograph PAN — air-blast circuit breaker ABB — contactor $CSA_1$ of A.C. - D.C. change-over unit — primary winding PW of main transformer TR to ground. The A.C. power induced in the secondary winding SW of the main transformer TR provides the input to the variable voltage controller VR. The main motor in the electric car is energized by the current supplied thereto via the circuit which is traced from the variable voltage controller VR — contactor $CSA_2$ — line breaker LB — main motor armature M — main motor field winding MF — main smoothing reactor MSL to the variable voltage controller VR. The speed of the electric car is controlled by controlling the phase of the voltage applied to the universal power converter VR functioning as the variable voltage controller thereby regulating the voltage applied to the main motor.

It will thus be understood that the electric car equipped with the single universal power converter according to the present invention can satisfactorily run in both the A.C. powered section and the D.C. powered section of the electrified railway system. The effect of the present invention is especially very great when applied to such an A.C. - D.C. dual-service electric car which is limited in the weight and external size thereof.

In the embodiment above described, the power converter VR is illustrated as including four thyristors, one reactor and one capacitor. It is apparent however, that the power converter VR can operate in entirely the same manner when a plurality of such elements are connected in series or in parallel.

It will be understood from the foregoing description that the present invention provides a single power converter which can operate reliably with both an A.C. power supply and a D.C. power supply while satisfying the desired power converting function, whereas it has heretofore been required to prepare both a D.C. - D.C. power converter and an A.C. - D.C. power converter to meet the power converting demand. Thus, the number of electrical elements such as main thyristors, auxiliary thyristors, etc. constituting the power converter can be reduced to about one-half of the number of such elements in the prior art ones, and the overall weight and external size of the power converter can also be reduced to about one-half of the prior art ones. Therefore, the power converter according to the present invention is smaller in size and lighter in weight than the prior art ones and can be manufactured at a greatly reduced cost. Further, the present invention provides a practical versatility in that the circuits of the single power converter may merely be suitably changed over for operation with both an A.C. power supply and a D.C. power supply.

Figure 6:
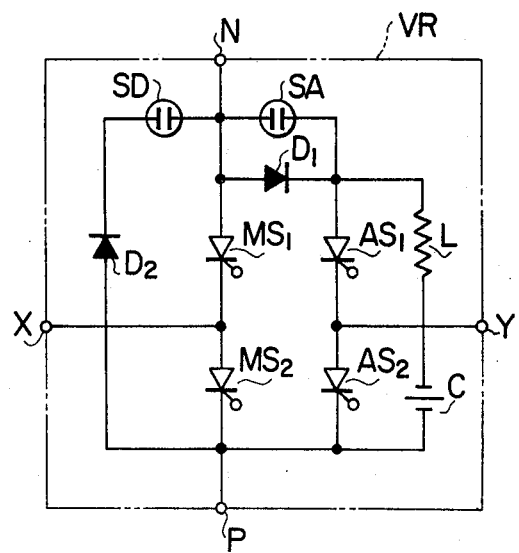
FIG. 6 is a circuit diagram showing a modification of the power converter shown in FIG. 3.

Another embodiment of the power converter according to the present invention is shown in FIG. 6. The embodiment shown in FIG. 6 is a modification of the basic embodiment shown in FIG. 3. Referring to FIG. 6, a switch SA for A.C. operation is connected in parallel with a diode $D_1$, and a commutating current by-pass diode $D_2$ is connected via a D.C.-operation switch SD in parallel with the series circuit of the main thyristors $MS_1$ and $MS_2$.

Figure 7:
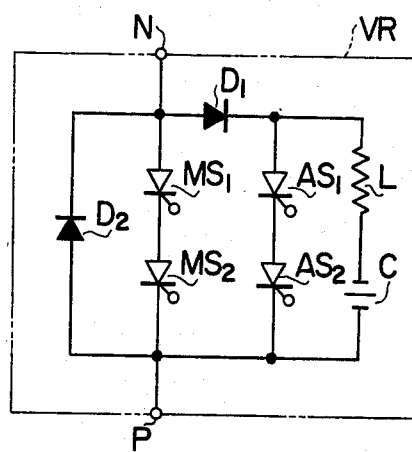
FIG. 7 is a connection diagram of the power converter structure shown in FIG. 6 when it is used in conjunction with a D.C. power source.

In the D.C. - D.C. conversion mode, the switch SA is opened and the switch SD is closed, to establish a circuit structure of a chopper in which the main thyristors $MS_1$, $MS_2$ and the auxiliary thyristors $AS_1$, $AS_2$ are connected in series respectively as shown in FIG. 7. At first, the main thyristors $MS_1$ and $MS_2$ are turned on to permit flow of main current from the negative terminal N to the positive terminal P. Then, the auxiliary thyristors or commutating thyristors $AS_1$ and $AS_2$ are turned on to cause electrical oscillation of the commutating reactor L and commutating capacitor C thereby turning off the main thyristors $MS_1$ and $MS_2$. When the main thyristors $MS_1$ and $MS_2$ are rendered nonconducting, the commutation energy stored in the commutating capacitor C is discharged by the route which is traced from the commutating capacitor C — diode $D_2$ — diode $D_1$ — commutating reactor L to the commutating capacitor C, so that the commutation energy is charged in the commutating capacitor C again. This manner of power converter operation is advantageous in that the commutation energy can be fully utilized to improve the efficiency of commutation. In the D.C. - D.C. conversion mode, the power converter VR functions as a chopper in a manner as described hereinbefore.

Figure 8:
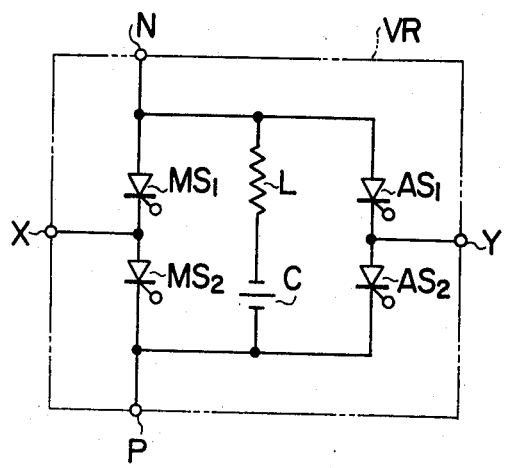
FIG. 8 is a connection diagram of the power converter structure shown in FIG. 6 when it is used in conjunction with an A.C. power source.

In the A.C. - D.C. conversion mode, the switch SD is opened and the switch SA is opened to establish a circuit structure of a variable voltage controller in which the two main thyristors $MS_1$, $MS_2$ and the two auxiliary thyristors $AS_1$, $AS_2$ are connected to form a bridge circuit as shown in FIG. 8. In this mode, therefore, the A.C. terminals X and Y are connected to the A.C. power source and the operating phase of the four thyristors $MS_1$, $MS_2$, $AS_1$ and $AS_2$ is controlled so as to control the main current flowing from the negative terminal N to the positive terminal P. In this case, the phase of the gate signal applied to each of the four thyristors may be suitably controlled so that the power converter VR may operate as an inverter instead of the converter. In such a case, the commutating reactor L and commutating capacitor C are utilized as a smoothing means.

Figure 9:
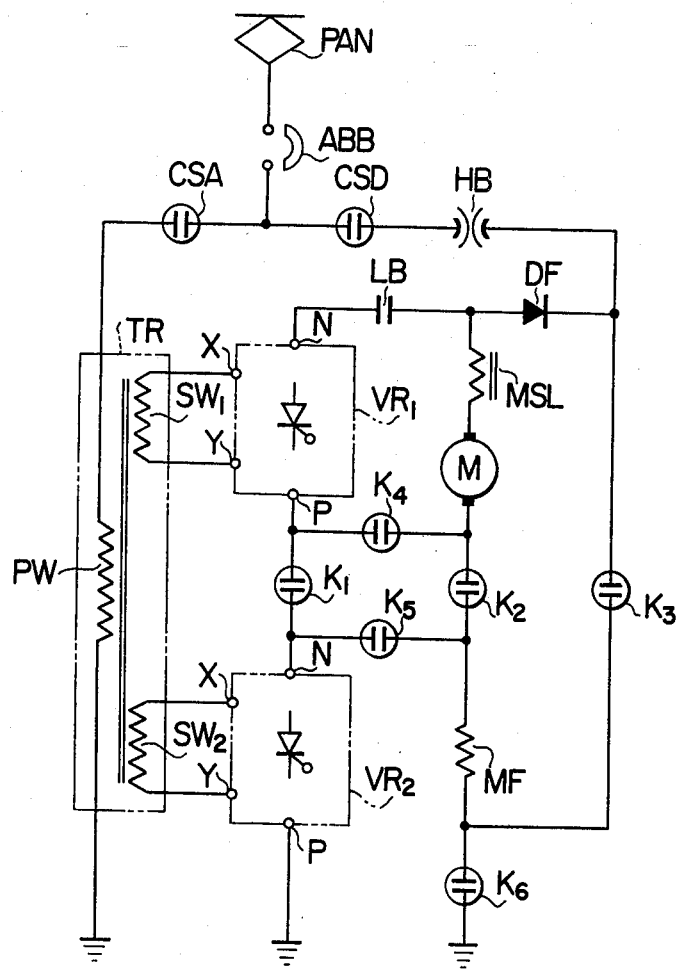
FIG. 9 is a circuit diagram showing another application of the power converter of the present invention to an A.C. - D.C. dual-service electric car.

FIG. 9 shows an application of a power converter as shown in FIG. 3 or 6 to an A.C. - D.C. dual-service electric car. The circuit shown in FIG. 9 includes a pantograph PAN, an air-blast circuit breaker ABB, a pair of contactors CSA and CSD of an A.C. - D.C. change-over unit, a main transformer TR having a primary winding PW and a pair of secondary windings $SW_1$ and $SW_2$, a high-speed circuit breaker HB, a reverse-current blocking or free-wheel diode DF, a main smoothing reactor MSL, a main motor armature M, a main motor field winding MF, a line breaker LB, a plurality of circuit change-over contactors $K_1$ to $K_6$, and a pair of universal power converters $VR_1$ and $VR_2$ having a structure as shown in FIG. 3 or 6.

The A.C. - D.C. dual-service electric car having the circuit shown in FIG. 9 is adapted to run under four kinds of operating conditions, that is, a power running condition in a D.C. powered section of an electrified reilway system, a regenerative breaking condition in such section, a power running condition in an A.C. powered section of the electrified railway system, and a regenerative braking condition in such section. FIG. 10 shows the on-off states of the individual contactors in the circuit shown in FIG. 9, and the symbol ○ is used to indicate that the corresponding contactors are closed. For example, in the power running condition in the D.C. powered section of the electrified railway system, the contactors ABB, CSD, HB, LB and $K_1 - K_3$ are closed, the contactors CSA and $K_4 - K_6$ are opened, and the power converters $VR_1$ and $VR_2$ operate as choppers.

Figure 11:
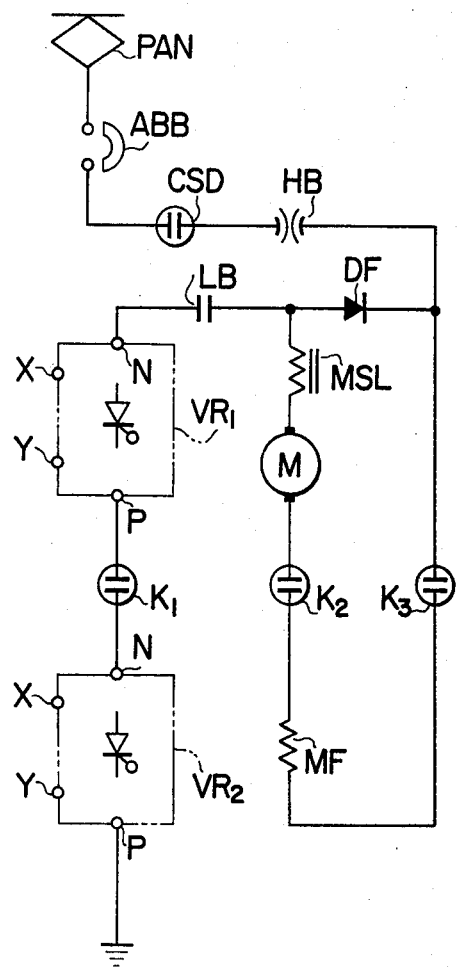
FIGS. 11 and 12 are connection diagrams representing the states of the circuit shown in FIG. 9 when the electric car is running in a D.C. powered section of an electrified railway system under a power running condition and under a regenerative braking condition respectively.

FIG. 11 shows the state of the circuit shown in FIG. 9 when the A.C. - D.C. dual-service electric car is running under the power running condition in the D.C. powered section of the electrified railway system. Referring to FIG. 11, the main motor in the electric car is energized by the D.C. power supplied thereto from the trolley wire via the circuit which is traced from the trolley wire — pantograph PAN — air-blast circuit breaker ABB — contactor CSD — high-speed circuit breaker HB — change-over contactor $K_3$ — main motor field winding MF — change-over contactor $K_2$ — main motor armature M — main smoothing reactor MSL — line breaker LB — universal power converter $VR_1$ — change-over contactor $K_1$ — universal power converter $VR_2$ to ground. The speed control of the electric car is carried out by controlling the duty factor of the universal power converters $VR_1$ and $VR_2$ functioning as the choppers thereby regulating the voltage applied to the main motor. The free-wheel diode DF is provided to ensure smooth supply of circulating current to the main motor by the circuit which is traced from the main motor armature M — main smoothing reactor MSL — free-wheel diode DF — change-over contactor $K_3$ — main motor field winding MF — change-over contactor $K_2$ to the main motor armature M even when the choppers are in the non-conducting state.

Figure 12:
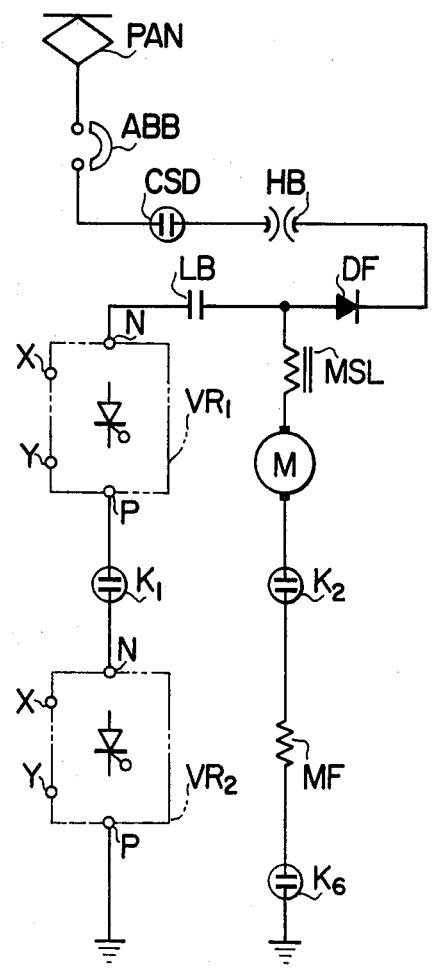

FIG. 12 shows the state of the circuit shown in FIG. 9 when the A.C. - D.C. dual-service electric car is running under the regenerative braking condition in the D.C. powered section of the electrified railway system. In this operating condition, the universal power converters $VR_1$ and $VR_2$ function as choppers. In response to the turn-on of the choppers $VR_1$ and $VR_2$, the power generated by the main motor is shorted to ground via the circuit which is traced from ground — change-over contactor $K_6$ — main motor field winding MF, change-over contactor $K_2$ — main motor armature M — main smoothing reactor MSL — line breaker LB — chopper $VR_1$ — change-over contactor $K_1$ — chopper $VR_2$ to ground, and the dynamic brake is imparted to the main motor. Then, when the choppers $VR_1$ and $VR_2$ are rendered non-conducting, the power generated by the main motor is returned to the power supply via the circuit which is traced from ground — change-over contactor $K_6$ — main motor field winding MF — change-over contactor $K_2$ — main motor armature M — main smoothing reactor MSL — free-wheel diode DF — high-speed circuit breaker HB — contactor CSD — air-blast circuit breaker ABB — pantograph PAN to the trolley wire. The choppers $VR_1$ and $VR_2$ are repeatedly turned on and off so that the power generated by the main motor is returned through the free-wheel diode DF and trolley wire to the D.C. power supply. The dynamic braking force imparted to the main motor is controlled by controlling the duty factor of the choppers $VR_1$ and $VR_2$.

Figure 13:
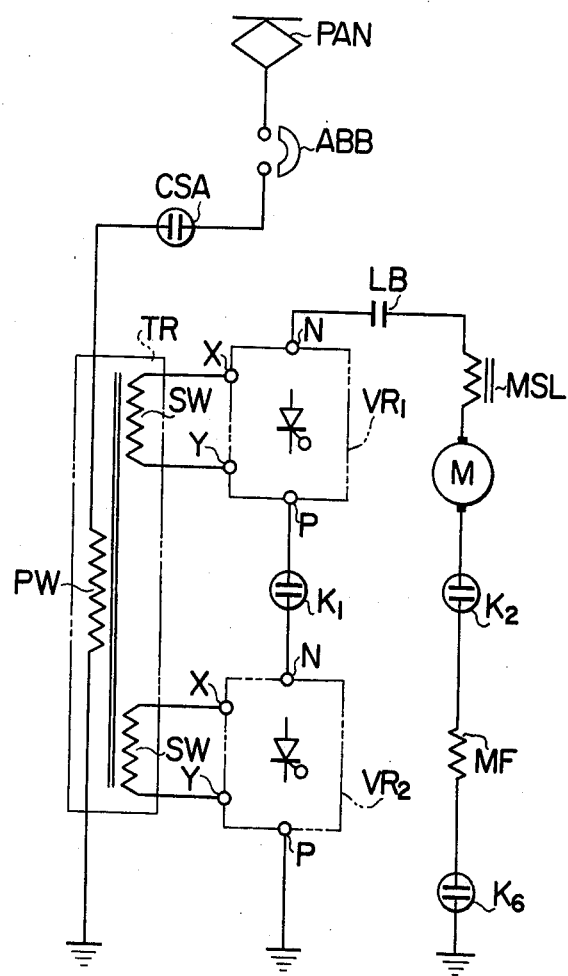
FIGS. 13 and 14 are connection diagrams representing the states of the circuit shown in FIG. 9 when the electric car is running in an A.C. powered section of an electrified railway system under a power running condition and under a regenerative braking condition respectively.

FIG. 13 shows the state of the circuit shown in FIG. 9 when the A.C. - D.C. dual-service electric car is running under the power running condition in the A.C. powered section of the electrified railway system. In this operating condition, the universal power converters $VR_1$ and $VR_2$ function as variable voltage controller type converters. The A.C. power is supplied from the trolley wire to the primary winding PW of the main transformer TR via the circuit which is traced from the trolley wire — pantograph PAN — air-blast circuit breaker ABB — contactor CSA — primary winding PW of main transformer TR to ground. The A.C. power induced in each of the two secondary windings $SW_1$ and $SW_2$ of the main transformer TR provides the input to each of the two converters $VR_1$ and $VR_2$. The D.C. outputs of these two converters $VR_1$ and $VR_2$ are added together and the resultant voltage is applied to the main motor in the electric car to energize the main motor via the circuit which is traced from ground — change-over contactor $K_6$ — main motor field winding MF — change-over contactor $K_2$ — main motor armature M — main smoothing reactor MSL — line breaker LB — converter $VR_1$ — change-over contactor $K_1$ — converter $VR_2$ to ground. The speed of the electric car is controlled by controlling the operating phase of the universal power converters $VR_1$ and $VR_2$ thereby regulating the voltage applied to the main motor.

Figure 14:
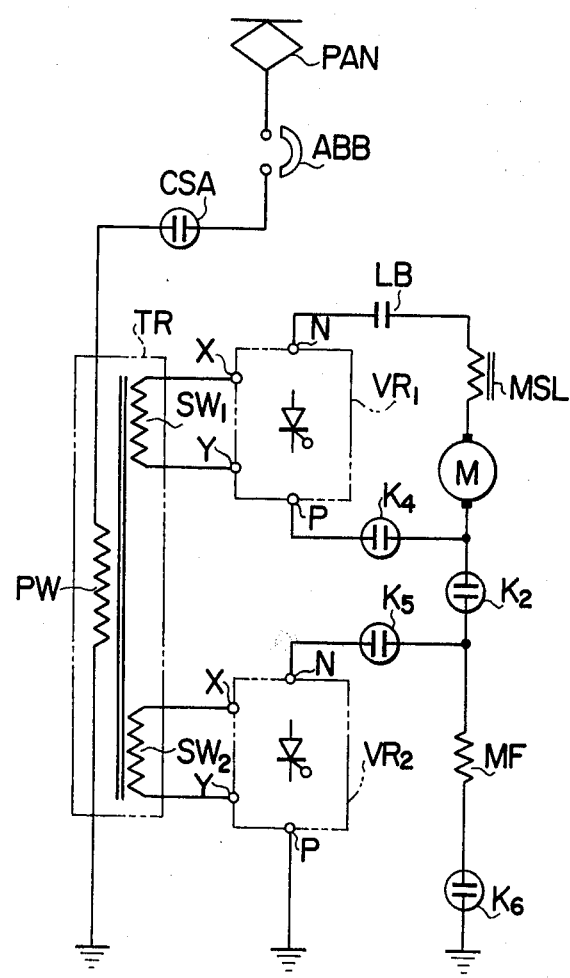

FIG. 14 shows the state of the circuit shown in FIG. 9 when the A.C. - D.C. dual-service electric car is running under the regenerative braking condition in the A.C. powered section of the electrified railway system. Referring to FIG. 14, the second universal power converter $VR_2$ connected to the second secondary winding $SW_2$ of the main transformer TR functions as a converter, and the main motor is energized by the circuit which is traced from ground — change-over contactor $K_6$ — main motor field winding MF — change-over contactor $K_5$ — converter $VR_2$ to ground. On the other hand, the first universal power converter $VR_1$ connected to the first secondary winding $SW_1$ of the main transformer TR functions as an inverter. The power generated by the main motor is applied to the inverter $VR_1$ by the circuit which is traced from the main motor armature M — main smoothing reactor MSL — line breaker LB — inverter $VR_1$ — change-over contactor $K_4$ to the main motor armature M and is induced in the primary winding PW of the main transformer TR through the first secondary winding $SW_1$ to which the inverter $VR_1$ is connected. Therefore, the power generated by the main motor is returned to the A.C. power supply via the circuit which is traced from ground — primary winding PW of main transformer TR — contactor CSA — air-blast circuit breaker ABB — pantograph PAN to the trolley wire. In the high speed range of the electric car, the braking force is controlled by controlling the operating phase of the converter $VR_2$ thereby regulating the degree of energization of the field winding MF of the main motor, while in the low speed range of the electric car, the braking force is controlled by controlling the operating phase of the inverter $VR_1$.

It will thus be seen that, according to the method of controlling the A.C. - D.C. dual-service electric car having the circuit shown in FIG. 9, the electric car can run under the power running and regenerative braking conditions in both the D.C. powered section and the A.C. powered section of the electrified railway system.

It will be understood from the foregoing description that a pair of universal power converters of single kind mounted in an A.C. - D.C. dual-service electric car can function as a chopper or a converter or an inverter as described so that the electric car equipped with such power converters can run under the power running and regenerative braking conditions in both the A.C. powered section and D.C. powered section of the electrified railway system. Further, by virtue of the fact that the power converters of single kind as above described are merely required, the overall size and weight of the power converting system can be reduced to about one-half of the prior art systems, and a great reduction in the cost can be attained.

The circuit shown in FIG. 9 is illustrated as including a main transformer having two secondary windings, two universal power converters and a single main motor. It is apparent however that the circuit can operate in entirely the same manner when a plurality of such elements are connected in series or in parallel.

We claim:

1. A power converter for regulating electric power supplied from a power source to a D.C. load, comprising a group of controlled rectifiers arranged to constitute a plurality of series circuits each including at least two said controlled rectifiers, said series circuits of said controlled rectifiers being connected in parallel to provide A.C. terminals at the series connection points of said controlled rectifiers and to provide D.C. terminals at the parallel connection points of said series circuits, a rectifier interposed between said parallel-connected series circuits of said controlled rectifiers, and a series circuit of a reactor and a capacitor connected in parallel with said series circuits of said controlled rectifiers.

2. A power converter as claimed in claim 1, wherein gate control means is provided so that said power converter functions as a chopper with said D.C. terminals connected to said power source and said load when said power source is a D.C. power supply, and said power converter functions as a converter or an inverter with said A.C. terminals and said D.C. terminals connected to said power source and said load respectively when said power source is an A.C. power supply.

3. A power converter as claimed in claim 2, wherein said gate control means comprises means for simultaneously controlling the gate of said controlled rectifiers in said series circuits when said power source is a D.C. power supply, and means for alternately controlling the gate of said controlled rectifiers in said series circuits when said power source is an A.C. power supply.

4. A power converter as claimed in claim 1, further comprising a first switch connected in parallel with said rectifier to be closed when said power source is an A.C. power supply, and a series circuit of a second switch and a diode connected in parallel with said series circuits of said controlled rectifiers, said second switch being closed when said power source is a D.C. power supply.

5. An A.C. - D.C. dual-service electric car equipped with a power converter of the character as claimed in claim 1, comprising a main transformer connected to a power source through a first switch which is closed when said power source is an A.C. power supply, and a main circuit including an armature and a field winding of a main D.C. motor and a reverse-current blocking rectifier, said main circuit being connected to said power source through a second switch which is closed when said power source is a D.C. power supply, and said power converter being connected at said A.C. terminals to a secondary winding of said main transformer and at said D.C. terminals to said main circuit.

6. An A.C. - D.C. dual-service electric car as claimed in claim 5, wherein at least two said power converters are provided, and said electric car operates in such a manner that; under a power running condition in a D.C. powered section of an electrified railway system, said power converters are connected in series with said main circuit to function as choppers for energizing said main D.C. motor by the D.C. power supplied from the trolley wire; under a regenerative braking condition in the D.C. powered section of the electrified railway system, said power converters are connected in parallel with the armature and field winding of said main D.C. motor in said main circuit and said reverse-current blocking rectifier is connected between the D.C. trolley wire and the parallel connection point of said main circuit portion and said powered converters so that said power converters function as choppers for returning the power generated by said main D.C. motor to the D.C. trolley wire through said reverse-current blocking rectifier; under a power running condition in an A.C. powered section of the electrified railway system, said power converters are connected in parallel with said main circuit to function as converters for energizing said main D.C. motor by the A.C. power supplied from the A.C. trolley wire; and under a regenerative braking condition in the A.C. powered section of the electrified railway system, one of said power converters functions as a converter for energizing the field winding of said main D.C. motor and the other said power converter functions as an inverter for returning the power generated by said main D.C. motor to the A.C. trolley wire through said inverter.

* * * * *